(12) United States Patent
Nagata et al.

(10) Patent No.: US 12,137,706 B2
(45) Date of Patent: Nov. 12, 2024

(54) MICRO-ENCAPSULATED AQUACULTURE FEED

(71) Applicant: SHIN NIPPON BIOMEDICAL LABORATORIES, LTD., Kagoshima (JP)

(72) Inventors: Ryoichi Nagata, Kagoshima (JP); Yutaka Kawakami, Kagoshima (JP)

(73) Assignee: Shin Nippon Biomedical Laboratories, Ltd., Kagoshima (JP)

( * ) Notice: Subject to any disclaimer, the term of this patent is extended or adjusted under 35 U.S.C. 154(b) by 570 days.

(21) Appl. No.: 16/835,336

(22) Filed: Mar. 31, 2020

(65) Prior Publication Data

US 2020/0221733 A1 Jul. 16, 2020

Related U.S. Application Data

(62) Division of application No. 15/545,326, filed as application No. PCT/JP2016/051879 on Jan. 22, 2016, now abandoned.

(30) Foreign Application Priority Data

Jan. 23, 2015 (JP) ................................. 2015-011860

(51) Int. Cl.
| | | |
|---|---|---|
| *A23K 40/30* | (2016.01) | |
| *A23J 3/34* | (2006.01) | |
| *A23K 20/00* | (2016.01) | |
| *A23K 20/142* | (2016.01) | |
| *A23K 20/147* | (2016.01) | |
| *A23K 20/158* | (2016.01) | |
| *A23K 20/163* | (2016.01) | |

(Continued)

(52) U.S. Cl.
CPC ............. *A23K 20/147* (2016.05); *A23J 3/341* (2013.01); *A23J 3/346* (2013.01); *A23K 20/00* (2016.05); *A23K 20/142* (2016.05); *A23K 20/158* (2016.05); *A23K 20/163* (2016.05); *A23K 40/30* (2016.05); *A23K 50/60* (2016.05); *A23K 50/80* (2016.05); *Y02A 40/818* (2018.01)

(58) Field of Classification Search
CPC ...... A23K 20/142; A23K 20/30; A23K 40/30; A23K 20/163
See application file for complete search history.

(56) References Cited

PUBLICATIONS

Hatate et al. (JP 10-327770-JPO English translation) (Year: 1998).*

(Continued)

*Primary Examiner* — Elizabeth Gwartney
(74) *Attorney, Agent, or Firm* — Pyprus Pte Ltd; George D. Liu

(57) ABSTRACT

To provide a feed that does not pollute rearing water, improves the immunity activity of leptocephalus larvae, is capable of directly feeding eel leptocephalus, and is capable of effectively inducing the growth of said larvae into glass eels. This micro-encapsulated aquaculture feed includes: an oil phase 11 having an oil-soluble nutrient component; a water phase 13 which is present inside the oil phase 11, and which includes a water-soluble nutrient component; and a film 15 which includes the oil phase 11 and the water phase 13. The water-soluble nutrient component includes at least one hydrolysate from among hydrolysates of amino acids, oligopeptides, and proteins.

9 Claims, 3 Drawing Sheets

(51) Int. Cl.
*A23K 50/60* (2016.01)
*A23K 50/80* (2016.01)

(56) References Cited

PUBLICATIONS

Villamar et al., "Delivery of dietary components to larval shrimp (*Penaeus vannamei*) by means of complex microcapsules", Marine Biology, 115, (1993), pp. 635-642. (Year: 1993).*

Enes et al., "Growth performance and metabolic utilization of diets including starch, dextrin, maltose or glucose as carbohydrate source by gilthead sea bream (*Sparus aurata*) juveniles", Fish Physiol. Biochem., 36, (2010), pp. 903-910. (Year: 2010).*

* cited by examiner

MICRO-ENCAPSULATED AQUACULTURE FEED

CROSS REFERENCES TO RELATED APPLICATIONS

This application is a divisional of application Ser. No. 15/545,326, filed Aug. 23, 2017, which is the National Stage of International Application No. PCT/JP2016/051879, filed Jan. 22, 2016, which claims the benefit of Japanese Application No. 2015-011860, filed Jan. 23, 2015.

TECHNICAL FIELD

The present invention relates to feed for aquaculture. More specifically, the present invention relates to feed for aquaculture capable of effectively growing leptocephalus larvae of eels up to glass eels. The present invention relates to biotechnologically and immunologically improved feed for aquaculture.

BACKGROUND ART

JP H11-253111 A (the following Patent Literature 1 (JP 2909536 B2)) discloses an eel bait prepared by suspending shark egg powder in seawater. JP 2005-13116 A (the following Patent Literature 2 (JP 4530248 B2)) discloses an eel bait containing a hill decomposition product or a soybean peptide with reduced phytic acid. The bait disclosed in JP 2005-13116 A (the following Patent Literature 2) also basically contains shark eggs. JP 2011-239695 A (the following Patent Literature 3) discloses eel larvae feed containing Lampridae fish egg contents. JP 2011-239696 A (the following Patent Literature 4) discloses eel larvae feed containing fish egg contents with reduced protease activity.

JP H11-56257 A (the following Patent Document 5) discloses a bait for feed organism of eel fry prepared by microencapsulating nutrients containing β-carotene. JP H11-56257 A (the following Patent Document 5) produces a microencapsulated bait for feed organism of eel fry containing β-carotene by stirring and emulsifying β-carotene, gelatin, gum arabic and fish oil (paragraphs [0008], [0009] and [0013]).

JP 2012-505193 A (the following Patent Document 6) discloses an immunostimulator containing a microencapsulated cytokine. JP 2012-505193 A (the following Patent Document 6) obtains microcapsules containing yeast expressing cytokines using malodextrin and a protective polymer (paragraph [0060]).

JP H10-327770 A (the following Patent Document 7) discloses microcapsules for feed in which an aqueous phase containing a water-soluble nutrient component is present in an oil phase containing an oil-soluble nutrient component, including microcapsules coated with a biodegradable polymer film. This microcapsule is a W/O/W type emulsion.

CITATION LIST

Patent Literature

Patent Literature 1: JP H11-253111 A
Patent Literature 2: JP 2005-13116 A
Patent Literature 3: JP 2011-239695 A
Patent Literature 4: JP 2011-239696 A
Patent Literature 5: JP H11-56257 A
Patent Literature 6: JP 2012-505193 A
Patent Literature 7: JP H10-327770 A

SUMMARY OF INVENTION

Technical Problem

As described in Patent Literatures 1 to 4, feed based on shark eggs or Lampridae fish eggs has been used for growing leptocephalus larvae corresponding to the larval stage of Japanese eel (*Anguilla japonica*) on a small scale. However, feed based on fish eggs is in the form of paste, thus is dispersed in water. Therefore, when feed based on fish eggs is administered to a large-scale culturing water tank, there is a problem that not only bait efficiency is poor but also water in the culture tank is contaminated. For this reason, a bait that does not deteriorate water quality even when culturing eels or the like on a large scale has been desired.

Therefore, a bait using microcapsules has been developed as described in Patent Literature 5 above. However, these were not necessarily able to prevent deterioration of water quality, and in particular, it was impossible to effectively grow leptocephalus larvae of eels up to glass eels. In particular, the microcapsule of Patent Literature 5 is a so-called W/O type, and there is a problem that only oil-soluble nutrient component can be contained as a nutrient component. For this reason, the microcapsule feed in Patent Literature 5 is feed for bait organisms, that is, mainly intended for use as enrichments for bait organisms commonly used in seed production of fish culture, like rotifers such as *Brachionus plicatilis*, a brine shrimp, etc. Further, Patent Literature 5 uses a hardly digestible polymeric substance such as gelatin or gum arabic to obtain microcapsules. Since the microcapsules in Patent Literature 5 are as small as 1 to 20 μm, there is a possibility that larval fish prey directly. However, larval fish with weak digestive function (for example, leptocephalus larvae) cannot completely digest this bait, thus there is a problem that utility value as feed for larval fish is very low.

Patent Literature 6 describes a product obtained by encapsulating a suspension containing a cytokine-expressing yeast by a spray drying method. The product of Patent Literature 6 is primarily intended to certainly orally administer cytokines to fish culture, so a bait is separately required. That is, the product of Patent Literature 6 is to be mixed into fish culture feed and thrown.

An object of the present invention is to provide feed that does not contaminate raising water and enhances the immune activity of leptocephalus larvae, can be directly thrown to eel leptocephalus, and can effectively grow the eel leptocephalus up to glass eels.

Solution to Problem

The present invention is basically based on the finding in an example that microencapsulated feed for aquaculture in which an aqueous phase containing a water-soluble nutrient component is present in an oil phase containing an oil-soluble nutrient component is feed for aquaculture suitable also for mass culture, without contaminating water quality.

In addition, the present invention is based on the finding that, by containing an immunostimulator for stimulating immune activity, leptocephalus larvae of eels, which were difficult to grow up to glass eels, can grow extremely efficiently up to glass eels.

That is, a first aspect of the present invention relates to microencapsulated feed for aquaculture 17. The feed for aquaculture is microencapsulated feed for aquaculture containing an oil phase 11 having an oil-soluble nutrient component, an aqueous phase 13 that is present in the oil phase 11 and contains a water-soluble nutrient component, and a coating 15 containing the oil phase 11 and the aqueous phase 13. Moreover, the water-soluble nutrient component includes any one or more of amino acids, oligopeptides, and protein hydrolysates. The water-soluble nutrient component may further contain saccharides selected from any one or more of monosaccharides, oligosaccharides, and polysaccharides.

Preferred feed for aquaculture of the present invention is feed for leptocephalus larvae of eels that is used for growing leptocephalus larvae of eels up to glass eels.

Preferred feed for aquaculture of the present invention is one in which the water-soluble nutrient component contains a protein hydrolysate, and the protein hydrolysate is obtained by hydrolyzing a protein source containing either or both of a vegetable protein and an animal protein, using a proteolytic enzyme, a hydrochloric acid, or hot water.

Preferred feed for aquaculture of the present invention is one in which the water-soluble nutrient component contains a protein hydrolysate, and the protein hydrolysate contains any one or more of soybean enzyme-treated proteins, fish and shellfish autolyzed extracts, fishmeal enzyme-treated decomposition extracts, and fish meat hot water-treated decomposition extracts.

Preferred feed for aquaculture of the present invention is one in which the coating 15 is a biodegradable polymer film.

Preferred feed for aquaculture of the present invention further contains an immunostimulator. Examples of the immunostimulator are any one or more of lactic acid bacteria, yeasts, *Aspergillus oryzae*, hay *Bacillus, Bacillus subtilis* var natto, intestinal bacteria derived from adult fish intestines of fish of the order Anguilliformes, intestinal bacteria derived from glass eel intestines of fish of the order Anguilliformes, and intestinal bacteria derived from leptocephalus larva intestines of fish of the order Anguilliformes. By using feed for aquaculture containing these immunostimulators, it is possible to effectively produce leptocephalus larvae of eels, which have been conventionally thought to be difficult to produce, up to glass eels.

Advantageous Effects of Invention

That is, according to the present invention, since nutrients are microencapsulated, it is possible to provide feed for aquaculture which does not degrade (deteriorate) water quality even when culturing fish on a large scale, unlike a pasty fish egg bait. Further, according to the present invention, it is possible to provide feed for aquaculture capable of effectively growing larval fish which is relatively difficult to produce seedlings, such as being able to enhance the immune activity of leptocephalus larvae and effectively grow to glass eels.

DESCRIPTION OF EMBODIMENTS

Figure 1:
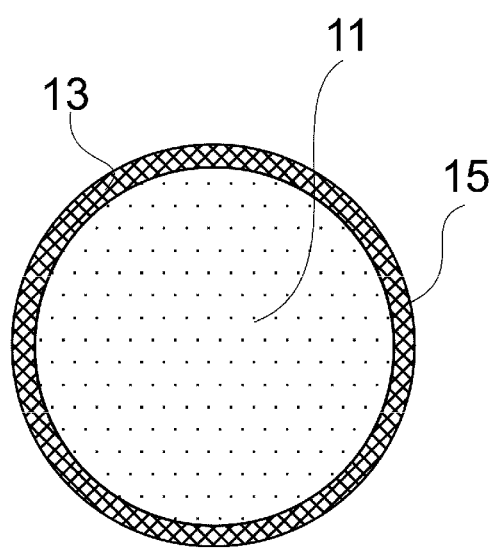
FIG. 1 is a conceptual diagram of the feed for aquaculture of the present invention.

Hereinafter, modes for carrying out the present invention will be described using the drawings. The present invention is not limited to the embodiments and examples described below, but also includes those appropriately modified within the scope obvious to those skilled in the art, based on the following embodiments.

The first aspect of the present invention relates to microencapsulated feed for aquaculture. Microencapsulation means to adjust feed such as baits to a size which is easy for aquatic organisms to prey and the like. The microencapsulated feed for aquaculture may have any shape such as spherical shape, pellet shape, and elliptical shape, and the average maximum diameter is, for example, 1 nm or more and 1000 µm or less, and may be 100 nm or more and 500 µm or less, 1 µm or more and 200 µm or less, or 5 µm or more and 100 µm or less. Particularly, when the feed for aquaculture of the present invention is used as feed for larval eels, a particle size of 1 to 200 µm is preferable. The feed for larval eels is feed for growing leptocephalus larvae to glass eels. The Japanese eels lay eggs near a water depth of about 200 meters in the spawning ground area, and the fertilized eggs hatch with gradually decreasing water depth, and become larva shaped like a leafy leaf called leptocephalus. When this leptocephalus grows and reaches the maximum elongation stage (6 cm or more), it undergoes metamorphosis, transforming from a flat body to a cylindrical body, and is said to be an almost transparent glass eel at a total length of about 6 cm.

Feed for Aquaculture

Feed for aquaculture means, for example, feed given as bait or nutrients to aquatic organisms (aquatic animals). Feed for aquaculture can be used as feed given to fish and shellfish in the aquaculture industry, and can also be used as feed for aquarium fish or a ground bait for fishing. The feed for aquaculture of the present invention may be administered alone as bait or nutrients, or may be administered mixed with other feed.

As described above, the fish targeted by the feed for aquaculture of the present invention is not particularly limited, but the feed for aquaculture of the present invention can be preferably used for fish of the order Anguilliformes and particularly preferably used for larval fish (leptocephalus larvae) of the fish of the order Anguilliformes. Examples of such fish of the order Anguilliformes include Japanese eel (*Anguilla japonica*), European eel (*A. anguilla*), American eel (*A. rostorata*), giant mottled eel (*A. marmorata*), New Guinean eel (*A. bicolor pacifica*), Indonesian eel (*A. bicolor bicolor*), Mozambican eel (*A. mossambica*), Australian eel (*A. australis australis*), Australian freshwater eel (*A. australis schmidtii*), Australian long-finned eel (*A. reinhardtii*), Cerebus eel (*A. celebesensis*), Polynesian long-finned eel (*A. megastoma*), Pacific short-finned eel (*A. obscura*), New Guinean alpine eel (*A. interioris*), Indian mottled eel (*A. nebulosa*), New Zealand long-finned eel (*A. diffenbachii*), Luzon eel (*A. luzonensis*), Bengali eel (*A. bengalensis bengalensis*), African eel (*A. bengalensis labiata*), continental freshwater eel (*A. breviceps*), continental eel (*A. nigricans*), Indonesian long-finned eel (*A. malgumora*), and the like. Other fish of the order Anguilliformes include common Japanese conger (*Conger, myriaster*), beach conger (*C. japonica*), *Ariosoma meeki, Gnathophis nystromi nystoromi, Synaphobranchus kaupii*, moray (*Gymnothorax kidako*), conger pike (*Muraenesox cinereus*), and pike eel (*Muraenesox bagio*).

The larval fish of the order Anguilliformes described in the present invention refers to the stage from the hatched larval fish to glass eels through the leptocephalus larvae. Fry of fish of the order Anguilliformes refers to the stage in which a glass eel has grown in both internal and external shapes, and the stage called "Kuroko" in which a black pigment has been deposited in the external shape.

FIG. 1 is a conceptual diagram of the feed for aquaculture of the present invention. As shown in FIG. 1, the feed for aquaculture contains an oil phase 11 having an oil-soluble nutrient component; an aqueous phase 13 that is present in the oil phase 11 and contains a water-soluble nutrient component; and a coating 15 containing the oil phase 11 and the aqueous phase 13 therein. In the feed for aquaculture of the present invention, it is not necessary for the oil phase 11 and the aqueous phase 13 to be completely separated, and all or a part of them may be in a mixed state. In particular, the aqueous phase may be dispersed in the oil phase.

The oil phase 11 may include, for example, one or both of animal oils and vegetable oils. Examples of the animal oils are oils extracted from fish eggs, fish oils, bird eggs (eg., chicken eggs), mammals and birds, and animal oils derived from fats and oils-producing bacteria. Examples of the vegetable oils are soybean oil and corn oil.

Examples of the oil-soluble nutrient component are various animal fats and oils, vegetable fats and oils, and fatty acids extracted and purified from them. The oil-soluble nutrient components include oil-soluble components as well as fat-soluble components. Other examples of the oil-soluble nutrient component are oil-soluble vitamins (such as vitamins A, D, E) and carotenoids such as β-cryptoxanthin. Besides those contained in the above animal oils and vegetable oils, oil-soluble vitamins themselves may be separately added to these oil-soluble vitamins. Also, other examples of the oil-soluble nutrient component are DHA and EPA. The concentration of the oil-soluble nutrient component is, for example, 5 to 30 wt %, and preferably 10 to 20 wt %, of the oil-soluble liquid.

The aqueous phase 13 contains a water-soluble nutrient component. Examples of the water-soluble nutrient component are any one or more of saccharides, amino acids, oligopeptides, protein hydrolysates, water-soluble vitamins, pantothenic acid, and nicotinic acid. Examples of the saccharides are monosaccharides, oligosaccharides, and polysaccharides. Specific examples of the saccharides are glucose, 1,5-anhydro-D-fructose, maltose, and trehalose. Leptocephalus larvae are low in digestive ability, thus saccharides composed of small molecules such as monosaccharides and disaccharides are preferable as the saccharides. In addition, since the feed of the present invention is microencapsulated feed having a structure of W/O/W, it is possible to effectively store saccharides composed of small molecules and ingest it to leptocephalus larvae.

An example of the amino acid is essential amino acids. An oligopeptide is a peptide formed by binding 2 to several hundred (e.g., 300) amino acids. An example of the protein hydrolysate is a hydrolysate using a protein source containing either or both of a vegetable protein and an animal protein using a proteolytic enzyme, hydrochloric acid, or hot water. The protein hydrolysate may be, for example, any one or more of soybean enzyme-treated proteins, fish and shellfish autolyzed extracts, fishmeal enzyme-treated decomposition extracts, and fish meat hot water-treated decomposition extracts.

An example of the vegetable protein is a soybean protein. Examples of the animal proteins are fish and shellfish extracts and zooplankton extracts. The soybean enzyme-treated protein is a soybean protein subjected to enzyme treatment. An example of the enzyme is a protease (proteolytic enzyme). That is, the soybean enzyme-treated protein is obtained by reducing the molecular weight of soybean protein with enzyme.

The fish and shellfish autolyzed extract is an extract extracted from fish and shellfish decomposed by autolysis. An example of a fish and shellfish autolyzed extraction method is described, for example, in JP 3268657 B2. The fish and shellfish autolyzed extraction method may decompose by a digestive enzyme contained in fish and shellfish itself, and decomposition may be promoted by, if necessary, adding an acid or hot water, and if necessary, acting a protease, shredding the fish and shellfish itself into mince, or by stirring. Examples of the fish and shellfish are anchovy, sardines, squid, and hill. The fish and shellfish autolyzed extract contains a lot of low molecular weight compounds such as amino acids. It is preferable that the fish and shellfish autolyzed extract is an extraction of water-soluble parts from fish and shellfish decomposed by autolysis. That is, fish and shellfish contain hard tissues such as bones and exoskeleton, and when a hard tissue is mixed in even a little bit, the digestive system of leptocephalus larvae that incorporate it will be damaged. For this reason, the fish and shellfish autolyzed extract that extracts water-soluble parts of decomposition products can be preferably incorporated even the leptocephalus larvae with weak digestive system.

The fishmeal enzyme-treated decomposition extract is an extract of one obtained by decomposing a powdery product of fish and shellfish by powder enzyme treatment. The method of enzyme treatment is described, for example, in JP 3408958 B2. In this method, fish and shellfish are treated with a proteolytic enzyme under stirring to obtain an emulsified composition. This emulsified composition is formed from a liquid phase containing a water-soluble amino acid, oligopeptide and vitamin, and water-soluble mineral components such as salts, and a solid phase including a fat and oil containing a water-insoluble highly unsaturated fatty acid and a protein having a molecular weight of 20,000 to 100,000. The emulsified composition is subjected to solid-liquid separation, and the liquid portion may be extracted as a fishmeal enzyme-treated decomposition extract. Other examples of the enzyme treatment are those described in JP 4804003 B2.

Fish meat hot water-treated decomposition extract is a method of treating fish meat with hot water under pressure to decompose the fish meat to obtain an extract. This hot water may properly contain a proteolytic enzyme. Specific example of hydrothermal treatment is disclosed in WO 2002/036802 A.

Specific examples of the protein hydrolyzate are soybean peptides, fish and shellfish extracts, yeast extracts, and phytoplankton extracts. Examples of the water-soluble vitamins are vitamins B1, B2, B6, and C. Vitamin C is preferable because it also functions as an antioxidant. An example of the concentration of the water-soluble nutrient component is 1 mg/ml to 500 mg/ml and preferably 2 mg/ml to 100 mg/ml, and may be 3 mg/ml to 100 mg/ml in the aqueous solution. An example of the solution is a buffer, and an example of the buffer is a phosphate buffer. Other examples of the solution are pure water, volume heavy water, saline, and physiological saline.

Example of the weight ratio of the aqueous phase 13 to the oil phase 11 is 1:10 to 10:1, and may be 1:5 to 5:1, or 1:3 to 3:1. Example of the weight ratio of the water-soluble nutrient component to the oil-soluble nutrient component is 1:10 to 10:1, and may be 1:5 to 5:1, or 1:3 to 3:1. Example of the weight ratio of the saccharides to the amino acid source (amino acid, oligopeptide, protein hydrolysate) is 1:10 to 10:1, and may be 1:5 to 5:1, or 1:3 to 3:1.

The microcapsule feed of the present invention is formed by being coated with the coating of biodegradable polymer as the wall material, in the state where the aqueous phase as described above is present in the oil phase. Examples of the biodegradable polymers used for the coating of the feed for aquaculture of the present invention are polysaccharide polymers such as cellulose, polypeptides, nucleic acids, aliphatic polyesters, and gelatin. Examples of the polysaccharide polymers are cellulose and polylactic acid polymers, among which polylactic acid polymers are preferred. The number average molecular weight of these polymers is 1,600 or more and 460,000 or less, preferably 80,000 or more and 160,000 or less, and may be 140,000 or more and 160,000 or less. In particular, when the feed for aquaculture of the present invention is administered to leptocephalus larvae, the number average molecular weight of the polymer is preferably from 80,000 to 100,000. The thickness of the coating of the feed for aquaculture of the present invention is, for example, 1 nm or more and 1 μm or less, and may be 1 μm or more and 50 μm or less, and is preferably 10 nm or more and 10 μm or less.

In the microcapsule feed of the present invention, various substances may be added to the above aqueous phase or oil phase, or to the inside of the coating not mixed with the aqueous phase or oil phase. Examples of such additives are algal components such as *spirulina*, dried *spirulina*, *spirulina* extract, *chlorella*, dried *chlorella*, and *chlorella* extract. The algal component is contained, for example, in an amount of 0.1 wt % or more and 10 wt % or less, and may be contained in an amount of 0.5 wt % or more and 5 wt %, in the microcapsule feed.

Preferred feed for aquaculture of the present invention further contains an immunostimulator. Examples of the immunostimulator are any one or more of lactic acid bacteria, yeasts, *Aspergillus oryzae*, hay *bacillus, Bacillus subtilis* var natto, intestinal bacteria derived from adult fish intestines of fish of the order Anguilliformes, intestinal bacteria derived from glass eel intestines of fish of the order Anguilliformes, and intestinal bacteria derived from leptocephalus larva intestines of fish of the order Anguilliformes. By using feed for aquaculture containing these immunostimulators, it is possible to effectively produce leptocephalus larvae of fish of the order Anguilliformes, which have been conventionally thought to be difficult to produce, up to glass eels. The immunostimulator is contained, for example, in an amount of 0.1 wt % or more and 10 wt % or less, and may be contained in an amount of 0.5 wt % or more and 5 wt %, in the microcapsule feed. As the intestinal bacteria derived from adult fish intestines of fish of the order Anguilliformes, intestinal bacteria derived from glass eel intestines of fish of the order Anguilliformes, and intestinal bacteria derived from leptocephalus larva intestines of fish of the order Anguilliformes, for example, intestinal bacteria taken from the intestines of healthy adult fish of fish of the order Anguilliformes, glass eel of fish of the order Anguilliformes and leptocephalus of fish of the order Anguilliformes, and those obtained by culturing the taken intestinal bacteria can be used. In addition, these may use, for example, bacteria taken after dissolving feces of healthy adult fish of fish of the order Anguilliformes, glass eel of fish of the order Anguilliformes and leptocephalus of fish of the order Anguilliformes, and those obtained by culturing the taken bacteria.

Method for Producing Feed for Aquaculture

The present invention also provides a method for producing the microencapsulated feed for aquaculture of the present invention.

The feed for aquaculture of the present invention can be produced by properly adopting the means used for encapsulation. The manufacturing process which is the basis of the feed for aquaculture of the present invention is, for example, as follows.

The manufacturing process includes a primary emulsification step, a secondary emulsification step, and an evaporation step. Next, each step will be described in detail.

Primary Emulsification Step

The primary emulsification step is a step of adding an aqueous solution (internal aqueous phase) of a water-soluble nutrient component to an oily solution (organic phase) in which a biodegradable polymer is dissolved in a (volatile) organic solvent as an oil-soluble nutrient component and a wall material polymer and stirring the mixture to adjust a W/O type emulsion.

Examples of the organic solvents are volatile organic solutions such as alkyl halides, arylalkyls, and ethers. Preferred examples of the solution of the oil-soluble liquid are dichloroethane, chloroform, toluene and dimethyl ether which are low-boiling organic solvents, among which dichloroethane is preferred. In the primary emulsification step, in addition to the above components, the element used in a known emulsification step may be appropriately added. For example, in the primary emulsification step, a suitable emulsion stabilizer may be blended. Examples of such emulsion stabilizers include various surfactants, water-soluble resins, water-soluble polysaccharides and the like generally used for emulsion adjustment, such as span-type surfactants like sorbitan monoate. The amount of the surfactant is, for example, 0.5 to 5 wt % of the oil-soluble liquid, and may be 1 to 3 wt % or 1 to 2 wt %.

In the primary emulsification step, an aqueous solution is obtained by putting the water-soluble nutrient component to a suitable solution. At that time, a protective material polymer is added for protecting the water-soluble nutrient component including bacteria. Examples of the protective material polymer include water-soluble polymeric polysaccharides like alginates and chitosan, and polyvinyl alcohols. Sodium alginate is particularly preferred. The water-soluble concentration in the case of using sodium alginate is preferably 0.5 to 5 wt %, and when it is too high, the dispersion stability of the W/O type emulsion is lowered and aggregation tends to occur.

Then, a W/O type emulsion can be obtained by using an emulsifying machine (homogenizer), or gradually injecting an aqueous solution into the prepared oily solution while stirring. The ratio (volume ratio) of the aqueous solution to the oily solution is, for example, 1:1 to 1:10, and may be 1:2 to 1:10, or 1:2 to 1:5. The primary emulsification step is preferably carried out under ice cooling, and the temperature of the oily solution is, for example, −15° C. to 4° C., and may be −10° C. to 0° C. The stirring speed is, for example, 1,000 to 10,000 rpm, and preferably 3,000 to 5,000 rpm. Stirring may be performed by ultrasonic vibration. The stirring time is, for example, from 10 minutes or more to 1 hour or less, and may be from 10 to 20 minutes.

Secondary Emulsification Step

The secondary emulsification step is a step of adding the W/O type emulsion obtained in the above primary emulsification step to an aqueous solution (external aqueous phase: second aqueous solution) different from one used in the primary emulsification step, and stirring the mixture to adjust a W/O/W type emulsion.

The second aqueous solution is preferably a solution containing a coating material or a dispersion stabilizer. Examples of the second aqueous solution are pure water, distilled water, and physiological saline. This second aqueous solution (external aqueous phase) is an aqueous solution of a water-soluble dispersion stabilizer. Examples of the water-soluble dispersion stabilizer include sodium polyacrylate, polyacrylamide, polyethylene imine, polyethylene oxide, polyvinyl pyrrolidone, and the like. Polyvinyl alcohol is particularly preferred. It is also recommended to include at least tricalcium phosphate for suppressing aggregation of droplet particles. Distilled water is used to adjust an aqueous solution of about 1 to 30 wt %, and particularly preferably 2 to 10 wt %.

The secondary emulsification step is preferably carried out at a slower stirring speed and in a shorter time than in the primary emulsification step. That is, a W/O type emulsion may be added to and mixed with an aqueous phase to be an external aqueous phase at ordinary temperature, and by continuing at a stirring speed of 300 to 1000 rpm for about 3 to 10 minutes, drop coalescence of the internal aqueous phase is carried out in each particle of the W/O type emulsion droplet that is a dispersed phase. By this droplet coalescence, the W/O type emulsion droplet is added to a droplet of a structure in which the inner single aqueous phase is covered with the outer organic phase.

Evaporation Step

The evaporation step is a step of evaporating the organic solvent from the W/O/W type emulsion obtained in the secondary emulsification step, thereby forming microcapsules including the aqueous phase containing the water-soluble nutrient component in the oil phase containing the oil-soluble nutrient component.

After the above droplet coalescence, one or both of warming and decompression is performed under stirring, in order to volatilize and remove the low-boiling organic solution of the organic phase by in-liquid drying. It is recommended to simultaneously perform warming and decompression from the viewpoint of processing efficiency. This evaporation step performs gentle stirring while warming to a temperature slightly higher than the boiling point of the volatile solution. When the low-boiling organic solvent of the organic phase is mainly composed of dichloroethane, the maximum achieving temperature is about 35° C. and the maximum pressure reduction is about 300 hPa, in in-liquid drying which simultaneously performs warming and decompression. The stirring speed in in-liquid drying is preferably about 100 to 1000 rpm, and the step time is preferably 1 to 24 hours, and particularly preferably 3 to 10 hours. It is preferable that the obtained microcapsules are filtered and dried and then cryopreserved, or filtered and then stored in an aqueous phase.

In each of the above steps, necessary nutrient components and immunostimulators may be appropriately mixed.

Aquaculture Method Using Feed for Aquaculture

The present invention also provides a culture method using the microencapsulated feed for aquaculture of the present invention.

As a method for culturing fish and shellfish, a known method may be appropriately adopted. Particularly, when culturing eel fry, for example, the apparatus disclosed in JP 2013-236598 A may be used. This apparatus is an apparatus for raising eels which raises eels under atmospheric pressure to induce sexual maturation. Moreover, this apparatus includes a water tank for storing raising water and eels, a water supply unit for supplying raising water to the water tank, a drainage water unit for discharging the raising water from the water tank, and a unit for adjusting the concentration of dissolved oxygen in the raising water.

When raising eel larvae using the feed of the present invention, it is preferable to directly put the above feed in a water tank for raising eel larvae and feed it in the precipitated or dispersed state. When circulating water in a raising water tank, it is preferable to stop or intermittent the water flow while feeding, in order to suppress the loss of bait in the drainage. It is preferable to feed so that the feed always remains and does not run short, and feed it from 1 to 5 separate times per day.

Example 1

Figure 2:
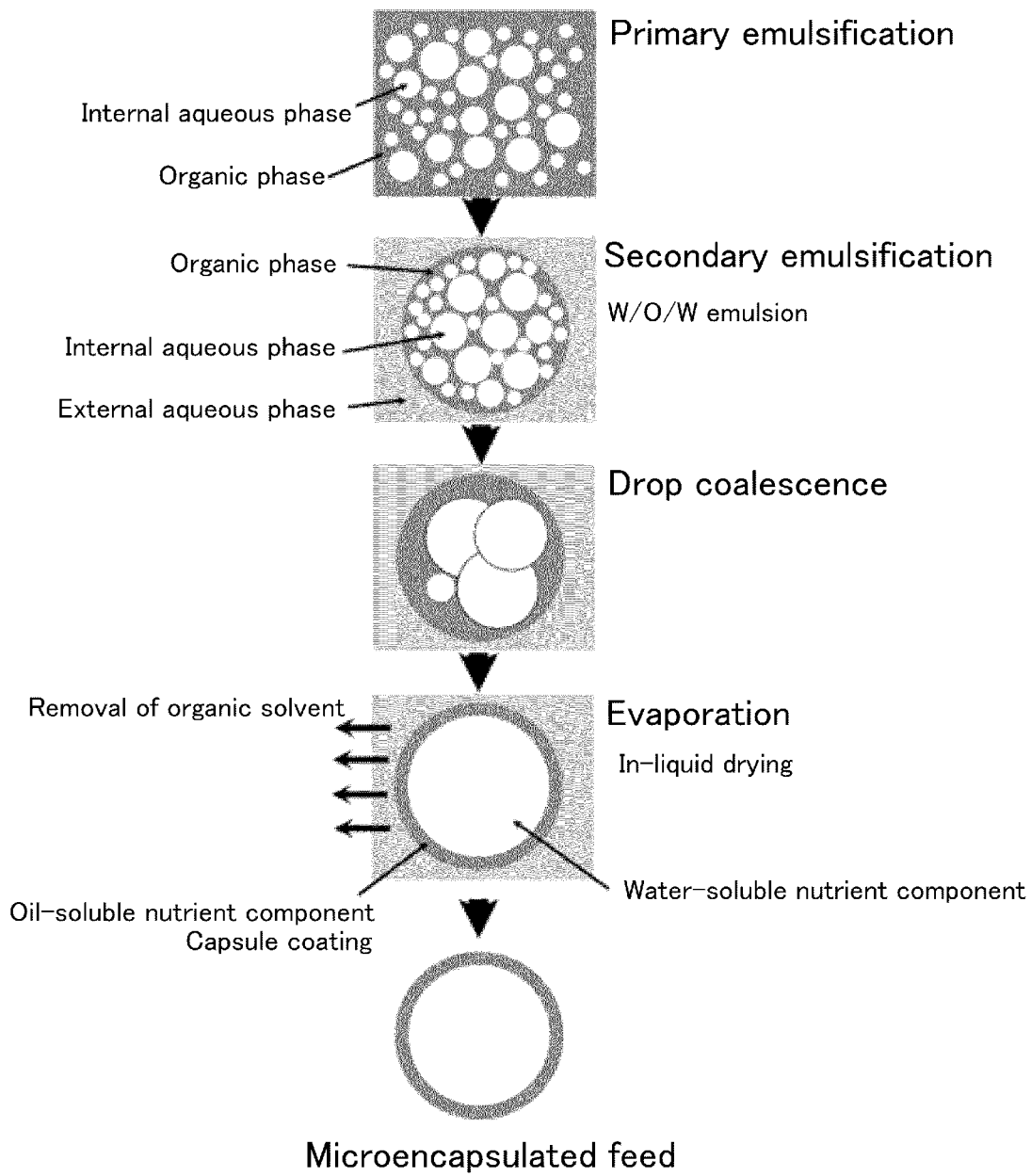
FIG. 2 is a conceptual diagram of a manufacturing process in Example 1.

Hereinafter, the present invention will be specifically described with reference to examples. The present invention is not limited by the examples, and those appropriately adopting known methods are also included in the present invention. Microcapsules suitable as feed of cultured larval fish were produced according to the above-described production method of microcapsules, using the following compositions and conditions. FIG. 2 is a conceptual diagram of a manufacturing process in Example 1.

Adjustment of Internal Aqueous Phase 36 ml of a phosphate buffer solution was added to and mixed with soybean enzyme-treated protein (manufactured by FUJI OIL CO., LTD.) and maltose, so as to be 20 mg/ml and 1 mg/ml, respectively, 1 ml of krill enzyme-treated decomposition extracting solution was further added, and 1 wt % sodium alginate was further added to adjust an internal aqueous phase.

Adjustment of Organic Phase 15 wt % Feed oil (manufactured by SANSHO BUSSAN CO., LTD.), 5 wt % polylactic acid polymer (average molecular weight 100,000) and 1.5 wt % sorbitan monooleate were added to and mixed with 108 ml of dichloroethane to adjust an organic phase.

Adjustment of External Aqueous Phase 4 wt % of polyvinyl alcohol and 0.3 wt % of tricalcium phosphate were added to and mixed with 680 ml of distilled water to adjust an external aqueous phase.

The internal aqueous phase was added and mixed while stirring the organic phase under ice cooling at 5000 rpm for 10 minutes to adjust a W/O type emulsion, and the W/O type emulsion was added to the external aqueous phase under stirring at ordinary temperature (20° C.) to adjust a W/O/W emulsion, followed by stirring at 150 rpm for 30 minutes at atmospheric pressure. Thereby, droplets in the internal aqueous phase in the dispersed W/O type emulsion droplet are united, then the resulting droplets were subjected to in-liquid drying treatment at a liquid temperature of 35° C. for 6 hours under an atmospheric pressure of 300 hPa, the produced microcapsules were separated by filtration, washed with 0.1 molar concentration of hydrochloric acid aqueous solution to remove the tricalcium phosphate, and further washed with distilled water, to recover the microcapsules.

The particle size of the microcapsules obtained using the above operating conditions and compositions was measured with a laser diffraction type particle size distribution apparatus, and found to have a particle diameter of 5 to 20 μm.

Example 2

Capsule feed was prepared in the same manner as in Example 1, except that 1 ml of a commercially available enzyme that activates microorganisms (LOVE Ibusuki) added with *Bacillus subtilis* var natto, dry yeast and lactic acid bacteria was added to the internal aqueous phase solution.

Example 3

Capsule feed was prepared in the same manner as in Example 1, except that 1 g of fine powder of satsuma orange dried peel containing a large amount of β-cryptoxanthin was added as a base to the phosphate buffer solution, the mixture was stirred at a low speed for 10 minutes, followed by centrifugation at 100 rpm for 5 minutes, and 1 ml of the obtained supernatant was added to the internal aqueous phase solution.

Example 4

Capsule feed was prepared in the same manner as in Example 1, except that spiny dogfish eggs were used instead of the feed oil in Example 1.

Example 5

Capsule feed was prepared in the same manner as in Example 1, except that 1 ml of *spirulina* extract was added to the internal aqueous phase solution.

Example 6

Capsule feed was prepared in the same manner as in Example 1, except that 1,5-anhydro-D-fructose was used instead of maltose.

Comparative Example 1

A bait was prepared using the method disclosed in JP H11-56257 (Patent Literature 3). More specifically, β-carotene, gelatin and fish oil were stirred and emulsified to produce microencapsulated bait of eel fry containing β-carotene (feed of Comparative Example 1).

Example 7

Using the feed of Examples 1 to 6 and Comparative Example 1, 20 each of 7-day-old leptocephalus larvae were stored in a 100 ml-small glass container, and a feeding test of the above samples was conducted. With each feed, contents were found in the alimentary canal of larvae, and feeding was confirmed.

Example 8

Using the feed of Examples 1 to 6 and Comparative Example 1, 200 each of 7-day-old leptocephalus larvae were stored in a 5 1-bowl shaped water tank, and a survival test using the above samples was performed. With the eel fry bait (Comparative Example 1) disclosed in JP H11-56257 (Patent Literature 5), the survival rate remarkably decreased after the start of the test, but with the feed of the present invention, the survival rate showed a result equivalent to the feed for larvae mainly consisting of shark eggs so far. Further, in the feed of the present invention, the water quality in the water tank was maintained.

Example 9

Adjustment of Aqueous Phase 16 g of soybean peptide and 1 g of sodium alginate were added to 80 ml of distilled water to adjust an aqueous phase.

Adjustment of Oil Phase 1.3 g of span 80 ((Z)-9-octadecenoic acid) was mixed to 130 g of rapeseed oil to adjust an organic phase.

Adjustment of Added Layer W/O 30 g of rapeseed oil, 0.3 g of Span 80, 10 ml of distilled water and 0.7 g of calcium chloride were mixed to adjust the added layer W/O.

Figure 3:
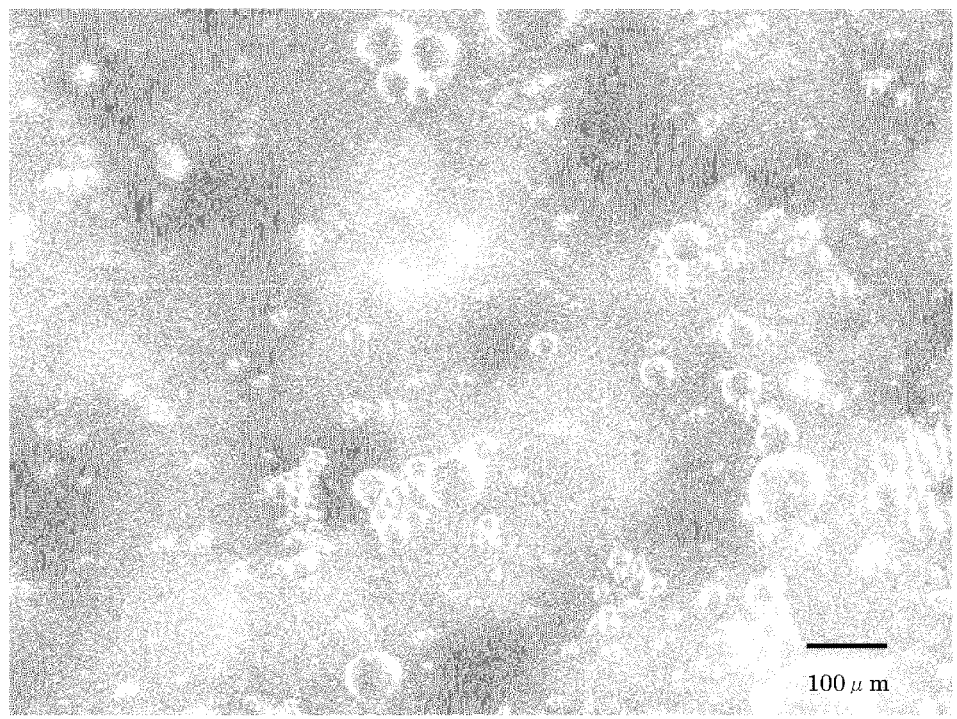
FIG. 3 is a photograph replacing the drawing when the microcapsules obtained in examples are dispersed in distilled water.

The aqueous phase was added and mixed for 10 minutes while stirring the oil phase at 25° C. at 200 rpm, to adjust a W/O type emulsion. Added layer W/O was added and mixed for 5 minutes while stirring this W/O type emulsion at 25° C. at 500 rpm. Further, it was stirred at 25° C. at 200 rpm to accelerate the polymerization reaction for 45 minutes. Filtration was performed to collect 20 g of microcapsules. 20 g of distilled water was added to and dispersed in 20 g of the collected microcapsules, and a photograph was taken. The obtained photograph is shown in FIG. 3. That is, FIG. 3 is a photograph replacing the drawing when the microcapsules obtained in Examples are dispersed in distilled water.

INDUSTRIAL APPLICABILITY

The present invention can be utilized particularly in the fisheries industry.

REFERENCE SIGNS LIST

11 Oil phase
13 Aqueous phase
15 Coating
17 Feed for aquaculture

The invention claimed is:

1. A method for breeding leptocephalus larvae of eels comprising step of feeding microencapsulated feed to the leptocephalus larvae of eels so as to grow the leptocephalus larvae of eels up to glass eels,
   wherein the microencapsulated feed comprising:
   an oil phase (11) having an oil-soluble nutrient component;
   an aqueous phase (13) that is present in the oil phase (11) and contains a water-soluble nutrient component, wherein the water-soluble nutrient component contains any one or more of monosaccharides and disaccharides, and any one or more of amino acids, oligopeptides, and protein hydrolysates;
   wherein the oil phase (11) and the aqueous phase (13) form water in oil type emulsion; and
   a coating (15) encapsulating the oil phase (11) and the aqueous phase (13).

2. The method for breeding leptocephalus larvae of eels in accordance with claim 1,
   wherein the leptocephalus larvae of eels are in a container or a water tank, wherein the leptocephalus larvae of eels are bred by feeding them with the microencapsulated feed in the container or the water tank.

3. The method for breeding leptocephalus larvae of eels in accordance with claim 1,
   wherein the one or more of monosaccharides and disaccharides are selected from the group consisting of glucose, 1,5-anhydro-D-fructose, maltose, and trehalose.

4. The method for breeding leptocephalus larvae of eels in accordance with claim 1,
   wherein the water-soluble nutrient component contains the disaccharides, and
   wherein the disaccharides is maltose.

5. The method for breeding leptocephalus larvae of eels in accordance with claim 4,
   wherein the coating (15) consists of biodegradable polymer as the wall material, where the biodegradable polymer is polylactic acid polymer with a number average molecular weight of the polymer from 80,000 to 100,000.

6. The method for breeding leptocephalus larvae of eels in accordance with claim 1,
wherein the oil phase (11) comprises feed oil, and
wherein the coating (15) comprises polyvinyl alcohol.

7. The method for breeding leptocephalus larvae of eels in accordance with claim 1,
wherein the water-soluble nutrient component further contains soybean enzyme-treated protein.

8. The method for breeding leptocephalus larvae of eels in accordance with claim 1,
wherein the water-soluble nutrient component further contains *Bacillus subtilis* var natto, dry yeast and lactic acid bacteria.

9. The method for breeding leptocephalus larvae of eels in accordance with claim 1,
wherein the water-soluble nutrient component further contains β-cryptoxanthin.

* * * * *